Jan. 13, 1959
B. THOMSON ET AL
2,867,947
GLASS TO METAL SEALS
Filed Jan. 25, 1956
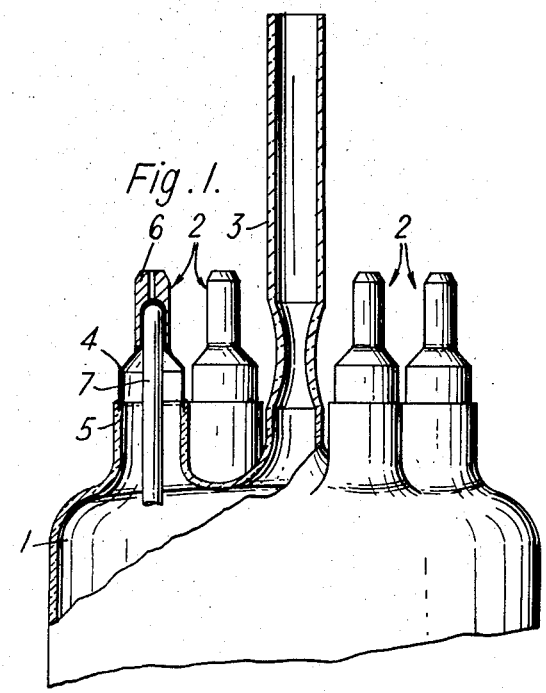
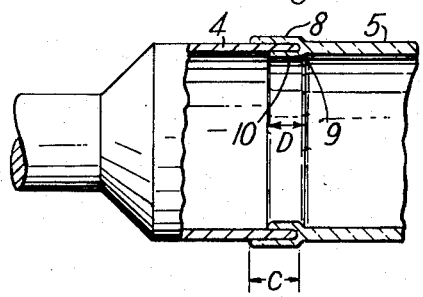 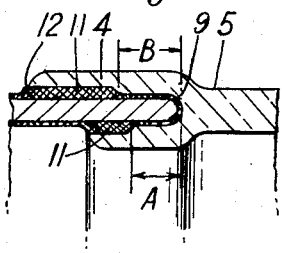
Inventors
B. THOMSON
E. W. SWIFT
By Robert Harding
Attorney

2,867,947
GLASS TO METAL SEALS

Bernard Thomson and Eric William Swift, Aldwych, London, England, assignors to International Standard Electric Corporation, New York, N. Y.

Application January 25, 1956, Serial No. 561,309

Claims priority, application Great Britain March 4, 1955

5 Claims. (Cl. 49—81)

The present invention relates to metal to glass seals and is particularly concerned with the method of manufacture of a particular type of seal, discussed in detail below, in which the base metal is coated with metal of higher conductivity. The invention is also concerned, though its use is not restricted thereto, with the manufacture of terminal bases for thermionic valves using this new metal to glass seal.

In recent years high power thermionic valves have increasingly used, in place of copper, envelope and terminal parts made from ferrous metal aloys whose thermal expansion characteristics approximate to those of borosilicate glasses so enabling them to be readily sealed to the glasswork of the valve. These alloys, marketed under various trade names, have a general content of 54% iron, about 17% cobalt and the remainder nickel. Special grades of medium hard borosilicate glass are also marketed under other trade names for matching to the respective alloys. The coefficients of thermal expansion of a matching alloy and glass are arranged to fit one another over the annealing range of the glass. (The annealing range is that range of temperatures between those for which, at the one extreme, the glass is so soft that any strain deforms it instantaneously, and at the other extreme, where the glass sets so rigidly that it yields to strains to a negligible extent with time. In between, plastic deformation of the glass can occur within a reasonable time of the application of strains.)

The above mentioned alloys have the disadvantage, particularly for use at high frequencies, that their electrical resistance is high compared with that of copper. Apart from high frequency losses, this means that the glass to metal seals tend to become overheated and operation of a valve, otherwise suitable, at too high a frequency may lead to its destruction. To overcome this defect, the alloy base metal is frequently coated with copper or other metal of higher conductivity to which the glass will seal. Though electro-plating is normally used, the coating may be applied by other methods, such as spraying. In the present specification we use the word "plated" to mean "coated with metal," not necessarily by electro-deposition.

Two types of seal are commonly used. In one, the "ring" seal, glass is laid down on the outer surface of a cylindrical pressing. In the other, the "fork" or "in and out" seal, the glass is laid down on both inner and outer surfaces of the metal with the metal rim embedded in the glass. When the nickel-cobalt-iron alloy is plated with copper for example, the differential expansion between the copper and the glass is liable to cause cracks in the seal and lifts between the glass and the metal also occur. Previous experience of copper-plated seals, using matched glass and alloy base metal, indicated that, while ring seals of larger than about 7 cms. diameter were satisfactory, smaller sizes were not so reliable and fork seals were definitely impractical. We have found, however, that by properly grading the thickness of the copper or other coating used, satisfactory fork seals can be made and that, in the smaller sizes, they are better than ring seals.

According to the present invention there is provided the method of manufacture of a plated metal to glass seal of the fork type referred to comprising coating the base metal over the areas to be sealed to the glass with metal of a higher conductivity to a thickness not greater than the maximum to provide a seal capable of withstanding thermal shock yet less than required, over areas not protected by the glass, to provide the requisite comductivity in the finished seal, coating the remaining areas of the base metal where high conductivity is required to such thickness as will suffice to provide the said requisite conductivity and sealing the glass to the thinner coating with the edge of the glass overlapping the thicker coating to prevent removal or impairment of any of the said thinner coating during subsequent processing of the seal.

By a "plated metal to glass seal" of the fork type referred to we mean a fork or "in and out" seal as previously explained using a base metal coated with a higher conductivity metal and a glass whose thermal expansion coefficient is matched over the annealing range of the glass to that of the base metal. The coating may be of copper or of any other high conductivity metal which will seal to the glass but which, in the finished seal, may provide an imperfect coating where not protected by the glass. Thus copper and chromium coatings are reduced in thickness by oxidation and cleaning operations, while thin coatings of gold or silver would be liable to mechanical damage, besides, as is well known, being porous to oxygen.

The invention will be more fully explained and an embodiment described with reference to the accompanying drawings in which:

Fig. 1 shows part of a terminal base for a thermionic valve to which the invention may be applied;

Fig. 2 shows a cup, and part of a terminal lug, such as used in Fig. 1, joined to a glass stem by means of a fork seal; and Fig. 3 shows an enlarged sectional view of a plated metal to glass seal according to the invention.

A typical valve base is shown in Fig. 1. The body of the base 1 is of moulded glass apertured to receive a number of terminal assemblies 2 and an exhaust tubulation 3. The terminal assemblies each comprise an alloy cup 4 sealed to a glass stem 5, which in turn is sealed to the base 1. A copper terminal lug 6 and a terminal post 7 are secured to the cup 4, one or other of the valve electrodes being joined to the terminal post. The base of the cup, where it is sealed to the glass stem, may be of the order of 2.5 cms. in diameter.

Assuming that the valve has a filamentary cathode, higher frequency currents flow along the terminal post 7 to the inner surface of the cup 4 inside lug 6 and, because of "skin effect," instead of flowing through the lug, flow down the inside of the cup 4, under the glass seal and up the outside of the cup to the external surface of the terminal lug. The higher the frequency of operation, therefore, the greater the danger of excessive temperature rise at the glass to metal seal; it is often necessary to direct jets of cooling air to these parts during operation of the valve. To reduce the heat losses and to extend the frequency range of operation of the valve, the alloy cups may be copper-plated inside and out. It is evident that the plating should preferably be continuous underneath the glass of the seal, as otherwise heating will occur at the very point where it should most be avoided. The thermal expansion characteristics of the plating, however, do not match those of the base alloy and the glass and strains which would not appear in an unplated seal are unavoidable.

Considerable attention has been paid to the problem of plated metal to glass seals using matched base metal and glass. As mentioned above, it has generally been concluded that plated ring seals in the larger sizes—say 4 cms. diameter and more—can be made entirely satisfactory but that the plating of fork seals is impractical. In the course of experiments to investigate suitable seals for terminals as described above with reference to Fig. 1, applicants first made up a number of ring seals, the stem 5 of Fig. 1 being sealed only to the outside of the cup 4 and not too near the lower rim. 50% of these cracked before they had cooled to room temperature. The remaining 50% were subjected to thermal shock tests consisting of alternate immersions in boiling water and water at room temperature. Not one seal withstood more than four cycles of this test, and of a further batch made up and similarly tested only one survived. This one cracked on the first cycle of a liquid oxygen to boiling water test.

In view of these tests attention was turned to the fork seal, an example of which is illustrated in Fig. 2. Here the glass of the stem 5 is first laid down on the outside of the cup 4, as indicated at 8, care being taken to exclude any air bubbles between the glass and metal. The glass is then lapped round the rim 9 of the metal as shown at 10, and is finally formed to shape.

Because of the differential thermal expansion between copper and glass, the thinner the coating the better the prospect of a successful seal. For high frequency conduction purposes a thickness of 0.013 mm. of copper is usually sufficient. During the sealing process the copper oxidises; allowing for this and the subsequent chemical cleaning, the coating thickness has to be increased to rather more than 0.38 mm. in order to be sure that the coating thickness is nowhere reduced below the above quoted minimum. Underneath the glass, however, the thickness of plating is not reduced to anything like the same extent, so that for a small diameter seal it is then excessive from the mechanical point of view. For the tests quoted above the coating was 0.05 mm. (0.002 inch). With the fork seal, published results showed that the fundamental weakness of a plated seal was cracking of the glass from the rim of the metal. The present applicants considered that this fault could be overcome if the coating thickness were graded down to about 0.013 mm. in the critical region: tests, quoted below, fully substantiate this thesis.

In the enlarged view of Fig. 3 it will be seen that in the region of the rim 9 the coating thickness is small. Beyond this region, underneath the edge of the glass, it is thicker, as indicated at 11, while in the parts not protected by the glass, as at 12, the thickness has been reduced by oxidation and cleaning. It is essential that the glass should extend over the thicker plating to ensure that the thinner plating is not removed at the glass edge. As the mechanical strains are here quite different from those nearer the metal rim 9, no trouble is experienced due to the thicker plating.

To make the seal, the alloy cup is first prepared and is outgassed as for an unplated seal according to known standard practice. The cup is then plated to the minimum thickness required for high frequency conduction. The region of the rim 9 is next masked and the remainder of the cup replated to the required thickness to take account of subsequent reduction during sealing, cleaning and any other final processing. For a 2.54 cm. diameter cup, formed with a wall thickness of 0.508 mm. (0.020 inch) from one of the proprietory makes of nickel-cobalt-iron alloy, the essential dimensions of the seal were:

Dimension A, Fig. 3 _____ 1.52 mm. to 2.54 mm.
Dimension B, Fig. 3 _____ 3.81 mm. to 5.08 mm.
Dimension C, Fig. 2 _____ 6.3 mm.
Dimension D, Fig. 2 _____ 3.81 mm.

The coating thickness over the regions A and B, i. e. the thickness of the first coating, before masking, was controlled within the limits 0.0127 mm. to 0.0203 mm. (i. e. 0.0005 to 0.0008 inch). After masking the areas A and B the coating thickness was built up to 0.0508 mm. over the remainder of the cup.

After coating, the cups are stoved in a non-oxidising atmosphere such as hydrogen. A very small amount of the copper diffuses into the base metal and forms a tight bond between the coating and the base metal. After this stoving the terminal lugs 6 and posts 7 are brazed to the cups, the rims of the cups being shielded to prevent contamination by the brazing material, and the cups are sealed to their stems. The completed terminal assemblies are sealed to the base 1 (Fig. 1) and then cleaned.

In order to test the soundness of this method of manufacture, a number of cups were plated, sealed to respective stems and subjected to thermal shock treatment by immersion in boiling water and then in water at room temperature. All the seals survive twenty cycles of this treatment and of five seals subjected to a boiling water to liquid air test, one cracked on the third cycle, two on the fifth, one on the sixth and the remaining one not until the eighth cycle.

Plated fork seals according to the invention have also been subjected to field trials by incorporation as terminal seals in a type of valve, originally designed for operation at 3 megacycles/sec., which has a long and heavy grid-filament assembly supported only by a base assembly such as shown in Fig. 1. The valves so modified have proved satisfactory in operation at a frequency of 22 mc./s. under normal user conditions with only a limited amount of extra cooling for the terminals.

Experiments have also been made with larger diameter seals such as are used for anode rings for transmitting valves. These have shown that plated fork seals according to the invention are equally as satisfactory as plated ring seals for diameters above about 7 cms. and are definitely superior for diameters around 2.5 cms. Thus, although the invention has been described with particular reference to the smaller type of seal as represented by the terminal assembly of Fig. 1, the invention is not limited thereto. Furthermore its application is not limited to any particular grade of base alloy or plating metal.

While the principles of the invention have been described above in connection with specific embodiments, and particular modifications thereof, it is to be clearly understood that this description is made only by way of example and not as a limitation on the scope of the invention.

What we claim is:

1. The method of manufacture of a plated metal to glass seal of the fork type referred to comprising coating the base metal over the areas to be sealed to the glass with metal of a higher conductivity to a thickness not greater than the maximum to provide a seal capable of withstanding thermal shock yet less than required, over areas not protected by the glass, to provide the requisite conductivity in the finished seal, coating the remaining areas of the base metal where high conductivity is required to such thickness as will suffice to provide the said requisite conductivity and sealing the glass to the thinner coating with the edge of the glass overlapping the thicker coating to prevent removal or impairment of any of the said thinner coating during subsequent processing of the seal, said thicker coating being laid down in steps of respective different thicknesses and said thinner coating plated to the minimum thickness required for high frequency conduction.

2. The method of manufacture according to claim 1 in which the said base metal is first plated to the thickness of the said thinner coating, the area to remain thinly plated is then masked and a further thickness of coating is laid down over the unmasked areas.

3. A metal to glass seal comprising a glass member formed with a reentrant fork-shaped tubular end as described and a tubular metal member, characterized in that said tubular metal member is provided with a metal coating over its exterior and interior surfaces of higher electrical conductivity than the metal of said tubular member, said coating over the areas to be sealed to the glass being of a thickness greater than the maximum necessary to provide a seal capable of withstanding thermal shock yet less than that required over areas not protected by the glass to provide the requisite conductivity and said coating over the remaining area of said tubular metal member being of such greater thickness as to provide the requisite conductivity, the glass being sealed to the thinner coating with the edges of the glass member overlapping the thicker coating, said thinner coating having a minimum thickness requisite for high frequency conduction.

4. A metal to glass seal according to claim 3, in which said tubular metal member is made of an alloy of iron, cobalt and nickel and said coating is made of a metal of greater electrical conductivity such as copper.

5. A metal to glass seal according to claim 3, in which said coating is thick beneath the region at the edges of the fork-shaped tubular end, and thin in the region adjacent the rim of said tubular metal member, said thinner coating being in the range of .0005 to .0008 inch thickness for frequencies in the megacycle range.

References Cited in the file of this patent

UNITED STATES PATENTS

| | | |
|---|---|---|
| 1,189,194 | Eldred | June 27, 1916 |
| 1,649,907 | Mayer | Nov. 22, 1927 |
| 1,692,998 | Ruben | Nov. 27, 1928 |
| 2,010,145 | Eitel | Aug. 6, 1935 |

FOREIGN PATENTS

| | | |
|---|---|---|
| 476,602 | Great Britain | Dec. 8, 1937 |
| 574,731 | Great Britain | Jan. 17, 1946 |
| 72,489 | Denmark | May 7, 1951 |